Figure 1:
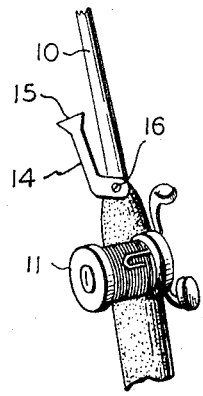

United States Patent [19]
Caruso

[11] 3,747,254
[45] July 24, 1973

[54] TROLLING RIG
[76] Inventor: Gerard Caruso, 3390 Curtis Dr., Hillcrest Heights, Md. 20023
[22] Filed: Apr. 22, 1971
[21] Appl. No.: 136,399

[52] U.S. Cl.............. 43/25.2, 43/42.05, 43/44.88
[51] Int. Cl....................... A01k 87/00, A01k 95/00
[58] Field of Search................ 43/25, 25.2, 42.05, 43/44.88, 43.13, 43.15, 44.93, 44.87, 44.95, 43.12, 23

[56] References Cited
UNITED STATES PATENTS
3,484,980  12/1969  Wait ..................................... 43/25.2
2,592,441  4/1952  Louthan............................. 43/44.88
2,737,752  3/1956  Childress .......................... 43/44.88

Primary Examiner—Warner H. Camp
Attorney—Laurence R. Brown

[57] ABSTRACT

A trolling rig is provided which permits a variable supply of line and lure to trail the sinker as desired by the fisherman, yet which will release the sinker upon receipt of a strike so that the fish may be completely reeled in by the rod. The rig comprises a pin affixed to the sinker. The line passes freely through the pin and may be inserted into a friction groove to hold the distance to the lure until a fish strikes. A holder is affixed to the rod for receiving the pin as line is paid out.

7 Claims, 5 Drawing Figures

PATENTED JUL 24 1973 3,747,254

INVENTOR
GERARD CARUSO

BY *Lawrence R. Brown*

ATTORNEY

TROLLING RIG

This invention relates to finishing equipment; and more specifically, it relates to trolling rigs.

When a lure is trolled behind a moving boat, it generally trails a weight of appropriate size to attain the right trolling depth. Usually it is desirable to have a leader length of several yards trail the weight. It is customary to tie the line at the weight. Thus, when a fish is hooked, the rod and reel can be used only to bring the line in up to the weight position, requiring the fish to be landed by hand over hand retrieval. This many times permits the fish to escape.

While slip sinkers have been known which release upon a strike, they have not been satisfactory and are difficult to adjust and to use in paying out the line.

Accordingly, it is an object of this invention to provide trolling rigs overcoming the foregoing problems.

A general object of the invention is to provide improved trolling equipment simple to use and effective.

Therefore, in accordance with the invention, a trolling rig is provided which comprises a weight assembly with a hole through which the line passes freely during payout. This weight assembly is shaped as a rod or pin which is held in a holder on the fishing rod at the handle at an angle permitting the lure and line to pay out freely without the weight until the proper lead distance is achieved. The pin has a simple frictional slot in which the line is fit when the payout distance is achieved, so that the sinker then becomes affixed to the line at a known distance from the lure. A fish strike, because of balance of the pin and sinker, will pull the line from the slot and release the sinker to pass to the end of the line as the fish is being retrieved by rod and reel.

Figure 2:
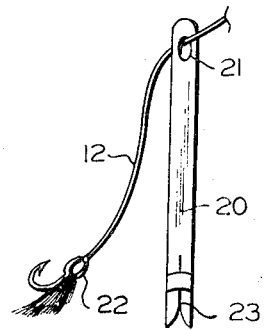
Figure 3:
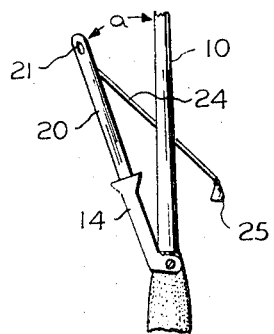
Figure 4:
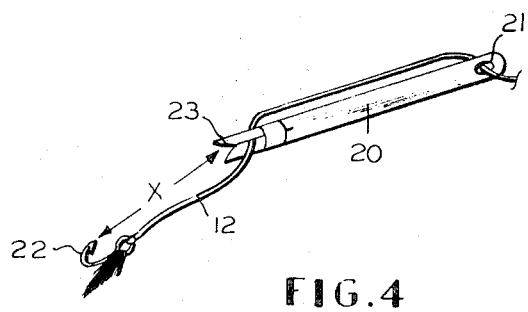
Figure 5:
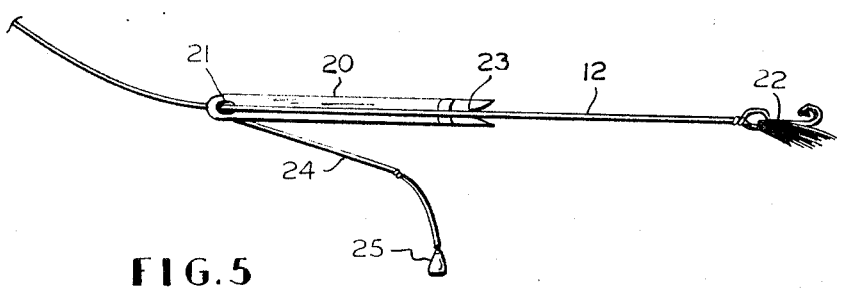

Further features, advantages and objects will be described in the following description of an embodiment of the invention, with reference to the accompanying drawing, wherein:

FIG. 1 is a sketch of a fishing rod, reel and trolling jig holder as afforded by this invention, FIG. 2 is a sketch of a trolling pin constructed in accordance with this invention, FIG. 3 is a sketch of the trolling pin in the holder, FIG. 4 is a sketch of the trolling pin as affixed to a position along the line for trolling, and FIG. 5 is a sketch of a line with the trolling pin in trolling position.

Referring now to the various views of the drawing, the fishing rod 10 has a reel 11 with line 12 extending therefrom. Affixed on the rod near the reel is a holder 14 comprising a receptacle barrel 15 and a clamp 16. The barrel is disposed at an angle a from the rod 10.

An elongated shaft or pin 20, preferably of wood, has therein a hole 21 near one end for receiving the line 12 before a lure 22 is attached. At the other end of pin 20 is a friction slot 23 for receiving and holding the line 12. The wooden pin will receive the line frictionally in slot 23 without snag or cut, will not become brittle or soft and is easy to make.

Extending from the pin 20 is a flexible link 24, such as spring wire, with a weight 25 at the end. The assembly is made with the weight coupled to an intermediater pin position such as to balance the pin in the water when trolling as shown in FIG. 5.

As may be seen in FIG. 4, the line 12 is inserted into slot 23 to frictionally hold the lure 22 a fixed distance $x$ from the trolling rig assembly.

In operation it may be seen that the trolling pin is held in holder 14 as shown in FIG. 3, while the line is threaded through hole 21 and a lure is affixed as shown in FIG. 2. The lure 22 can then be released in the water as line 12 freely pays out through hole 21 with the pin at angle a, which prevents binding or snagging.

When the lead portion of the line between the pin 20 and lure 22 becomes the desired length ($x$) the pin may be removed from the holder socket and the line frictionally inserted in the slit clamp 23 so that the rig-weight assembly can be trolled as shown in FIG. 5. The friction is sufficient to hold the rig in place for trolling, but if a fish strikes lure 22, it will tend to straighten the line and release line 12 from the slit 23 so that the rig will feed freely along the line to reach the lure, as shown in FIG. 2. Thus, the fish can be reeled in while using the rod without changing to hand-over-hand retrieval for the fish over the lead length $x$ which may be several yards long.

It is evident, therefore, that the trolling rig of this invention is readily used with a rod and reel, and can be easily manipulated with one hand while operating the rod as the lure is released without snagging or coiling the line, nd can be easily retrieved when a fish strikes completely to the end of the line.

What is claimed is:

1. A trolling rig for use with a fisihing rod with attached reel and line with a lure on the end coprising in combination, a trolling member having a weight affixed thereto, a holder with mating means for receiving said member, means affixing said holder to said fishing rod near the reel, an aperture in said trolling member for freely passing fishing line, and releasable means on said member for optionally holding the member at a variably selectable fixed position on said line while the line and member is trolled but providing for release when a fish strikes so that the member slips on the line by means of said aperture to the vicinity of the lure.

2. A rig as defined in claim 1 wherein said member comprises an elongated pin with said aperture in one end and a friction slot in the other end for receiving the line.

3. A rig as defined in claim 2 including flexible means for suspending said weight from said pin.

4. A rig as defined in claim 2 wherein said pin is wooden.

5. A trolling rig for riding on a fishing line comprising an elongated pin with a hole in one end through which the line is passed and a friction slot to releasably hold the line in the other end, and means affixing a weight to said pin.

6. A rig as defined in claim 5 in combination with a fishing rod, a reel, a line on said reel threaded through said hole, a lure on the end of said line, and a holder affixed to said rod for receiving said pin.

7. A rig as defined in claim 6 wherein said holder comprises a receptacle receiving the slotted end of said pin and holding it at such an angle and extended at such a distance from said rod that the line and lure feeds freely through said hole from said rod and reel while the lure is being trolled.

* * * * *